(12) United States Patent
Lin et al.

(10) Patent No.: US 8,040,686 B2
(45) Date of Patent: Oct. 18, 2011

(54) POWER SUPPLY APPARATUS HAVING DC-DC CONVERTER MODULE MOUNTED ON INDIVIDUAL PRINTED CIRCUIT BOARD

(75) Inventors: Yao-Chang Lin, Taipei (TW); Hsiu-Cheng Chang, Taipei (TW)

(73) Assignee: Sea Sonic Electronics Co., Ltd., Taipei (TW)

( * ) Notice: Subject to any disclaimer, the term of this patent is extended or adjusted under 35 U.S.C. 154(b) by 462 days.

(21) Appl. No.: 12/354,377

(22) Filed: Jan. 15, 2009

(65) Prior Publication Data
US 2009/0161326 A1    Jun. 25, 2009

(51) Int. Cl.
*H01R 12/00* (2006.01)
(52) U.S. Cl. ... 361/796; 361/600; 361/601; 361/679.02; 361/792; 363/59; 363/21.16; 363/141; 363/146; 323/284; 323/283; 323/282; 323/351
(58) Field of Classification Search .......... None
See application file for complete search history.

(56) References Cited

U.S. PATENT DOCUMENTS

| | | | | |
|---|---|---|---|---|
| 5,675,816 | A * | 10/1997 | Hiyoshi et al. | 713/324 |
| 6,061,238 | A * | 5/2000 | Osakada et al. | 361/703 |
| 6,108,731 | A * | 8/2000 | Suzuki et al. | 710/301 |
| 6,556,609 | B2 * | 4/2003 | Bragin et al. | 372/57 |
| 6,709,277 | B2 * | 3/2004 | Ruttan et al. | 439/66 |
| 6,884,086 | B1 * | 4/2005 | Ruttan et al. | 439/66 |
| 7,215,542 | B2 * | 5/2007 | Chen et al. | 361/694 |
| 7,851,940 | B2 * | 12/2010 | Mahin et al. | 307/11 |

* cited by examiner

*Primary Examiner* — Michail V Datskovskiy
(74) *Attorney, Agent, or Firm* — Muncy, Geissler, Olds & Lowe, PLLC

(57) ABSTRACT

This invention provides a power supply comprising a mother board, a first socket, and a DC-DC converter module. The mother board comprises a transformer operative for transforming an input power into a first AC output power and a filter operative for receiving the first AC output power and filtering the first AC output power into a first DC output power. The first socket is mounted on the mother board and electrically coupled to a circuitry of the mother board by way of at least one conductor terminal operative for providing the first DC output power. The DC-DC converter module mounted on a printed circuit board electrically coupled to the mother board comprises a DC-DC converter operative for receiving the first DC output power and converting the first DC output power into a second DC output power and a third DC output power and a second socket operative for providing the second DC output power and the third DC output power by means of a conductive path of the printed circuit board. There are several advantages including the reduction of the use of the conductive wires, the improvement of the efficiency of the power supply, the simplicity of the circuitry of the power supply, and the easy replacement of the broken component because the DC-DC converter module is mounted on an individual printed circuit board different from the mother board.

20 Claims, 5 Drawing Sheets

US 8,040,686 B2

POWER SUPPLY APPARATUS HAVING DC-DC CONVERTER MODULE MOUNTED ON INDIVIDUAL PRINTED CIRCUIT BOARD

BACKGROUND OF THE PRESENT INVENTION

1. Field of Invention

The present invention relates to a power supply, and more particularly to a power supply including a DC-DC converter module mounted on an individual printed circuit board different from a mother board.

2. Description of Related Arts

Referring to FIG. 1, a perspective view of a conventional power supply is illustrated. As shown in FIG. 1, the power supply 100 includes a mother board 110 and a housing 120. An example of the typical mother board 110 generally comprises some basic components such as transformers 111, capacitors, resistors, filters, etc mounted on the mother board 110. The mother board 110 is electrically connected to an outer power source by means of the input socket 112 for receiving an AC input power from the outer power source and providing a DC output power from the power supply 100 to a component disposed inside of the computer case via a removable cable attached to the power supply 100, wherein the transformer 111 converts the received AC input power into a 12 volt AC power, a 5 volt AC power, and/or a 3.3 volt AC power and the 12 volt AC power, the 5 volt AC power, and/or the 3.3 volt AC power are/is filtered by the filter to provide a 12 volt DC power, a 5 volt DC power, and/or a 3.3 volt DC power. The 12 volt DC power, the 5 volt DC power, and/or the 3.3 volt DC power are/is coupled and delivered to a socket 117 by means of a plurality of wires 113A, 113B, 114A, 114B, 115A, 115B, 116A, and 116B for supplying the 12 volt DC power, the 5 volt DC power, and/or the 3.3 volt DC power from the mother board 110 to the socket 117. It is necessary to utilize a plurality of wires 113A, 113B, 114A, 114B, 15A, 15B, 116A, and 116B to supply the 12 volt DC power, the 5 volt DC power, and/or the 3.3 volt DC power from the mother board 110 to the socket 117, respectively. Thus, the circuitry of the power supply 100 is more complex and has more power consumption because there are more conductive wires utilized in the power supply 100. In other words, there are more conductive wires electrically connected between the mother board 110 and the socket 117, which means higher resistance and more power losses.

Referring to FIG. 2, a perspective view of another conventional power supply including a DC-DC converter is illustrated. As shown in FIG. 2, the power supply 200 includes a mother board 210 and a housing 220. An example of the typical mother board 210 generally comprises some basic components such as transformers 211, a DC-DC converter 213, capacitors, resistors, filters, etc mounted on the mother board 210. The mother board 210 is electrically connected to an outer power source by means of the input socket 212 for receiving an AC input power from the outer power source and providing a DC output power from the power supply 200 to a component disposed inside of the computer case via a removable cable attached to the power supply 200, wherein the transformer 211 converts the received AC input power into a 12 volt AC power and the 12 volt AC power is filtered by the filter to provide a 12 volt DC power. The 12 volt DC power is converted by the DC-DC converter 213 to provide a 5 volt DC power and/or a 3.3 volt DC power. The 12 volt DC power, the 5 volt DC power and/or the 3.3 volt DC power are/is coupled and delivered to a socket 217 by means of a plurality of conductive wires for supplying the 12 volt DC power, the 5 volt DC power, and/or the 3.3 volt DC power from the mother board 210 to the socket 217. It is necessary to utilize a plurality of conductive wires to supply the 12 volt DC power, the 5 volt DC power, and/or the 3.3 volt DC power from the mother board 210 to the socket 217, respectively. Thus, the circuitry of the power supply 200 is more complex and has more power consumption because there are more conductive wires utilized in the power supply 200. In other words, there are more conductive wires electrically connected between the mother board 210 and the socket 217, which means higher resistance and more power losses.

It would thus be desirable to provide a power supply in order to reduce the use of the conductive wires and simply the circuitry such that the power loss and the power efficiency could be improved.

SUMMARY OF THE PRESENT INVENTION

A main object of the present invention is to provide a power supply having a DC-DC converter module which can reduce the use of the conductive wires and simply the circuitry of the power supply because the mother board and the individual printed circuit board are two separated board wherein the DC-DC converter module is mounted on the individual printed circuit board and just only two conductive wires are utilized to electrically connect the DC-DC converter module to the mother board. Thus, the more conductive wires could be eliminated.

Another object of the present invention is to provide a power supply having a DC-DC converter module which can reduce the power loss and voltage drop problems because the reduction of the use of the conductive wires wherein the mother board and the individual printed circuit board are two separated board and the circuitries of the mother board and the individual printed circuit board can be designed respectively.

Another object of the present invention is to provide a power supply having a DC-DC converter module which can improve the power efficiency because the reduction of the power loss and the use of the conductive wires.

Another object of the present invention is to provide a power supply having a DC-DC converter module which can be easily repaired or replaced because the mother board and the individual printed circuit board are two separated board such that the manufacturing cost could be reduced and the efficiency of the power supply could be improved.

Accordingly, in order to accomplish the one or some or all above objects, the present invention provides a power supply, comprising:

a mother board, comprising:
  a transformer operative for transforming an input power into a first AC output power; and
  a filter operative for receiving the first AC output power and filtering the first AC output power into a first DC output power;
a first socket mounted on the mother board and electrically coupled to a circuitry of the mother board by way of at least one conductor terminal for providing the first DC output power; and
a DC-DC converter module mounted on a printed circuit board electrically coupled to the mother board, comprising:
  a DC-DC converter operative for receiving the first DC output power and converting the first DC output power into a second DC output power and a third DC output power; and
  a second socket operative for providing the second DC output power and the third DC output power by means of a conductive connection between the printed circuit board and the second socket.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

DETAILED DESCRIPTION OF THE PREFERRED EMBODIMENT

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
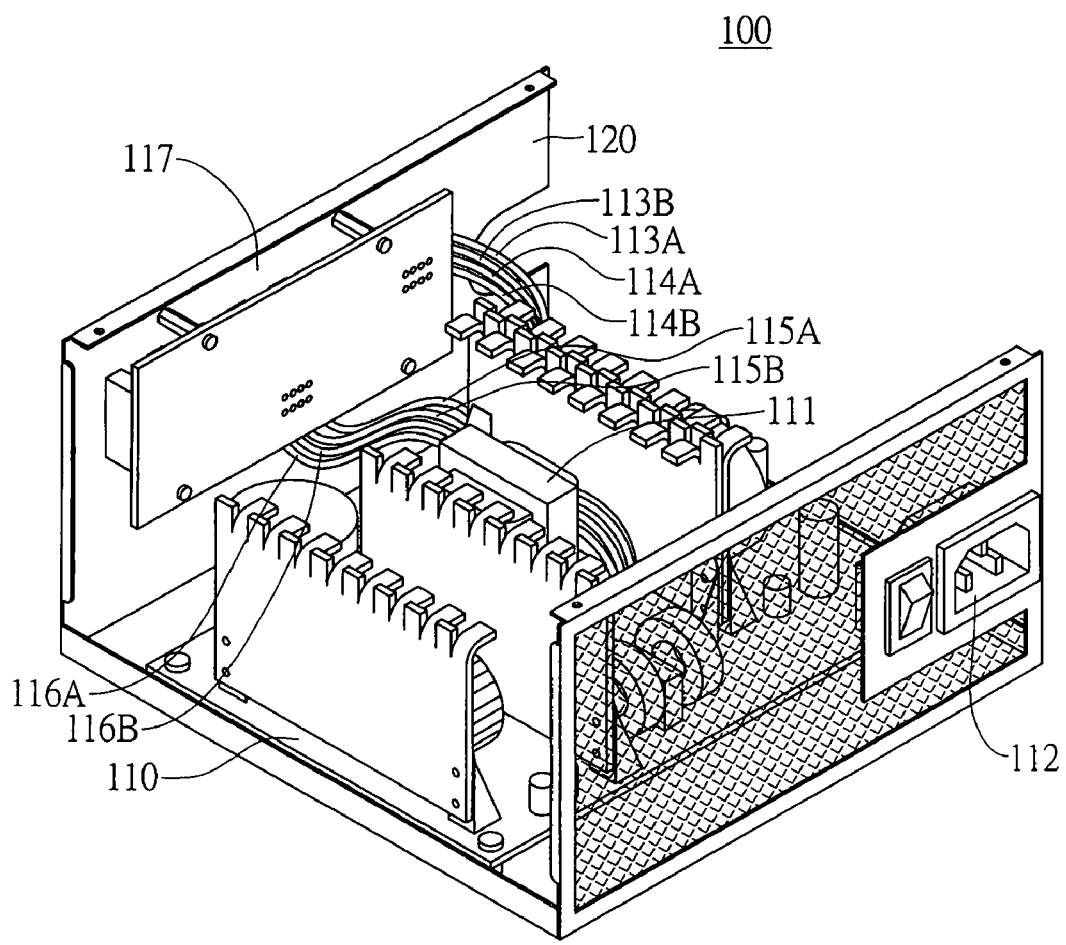
FIG. 1 shows a perspective view of a conventional power supply.
Figure 2:
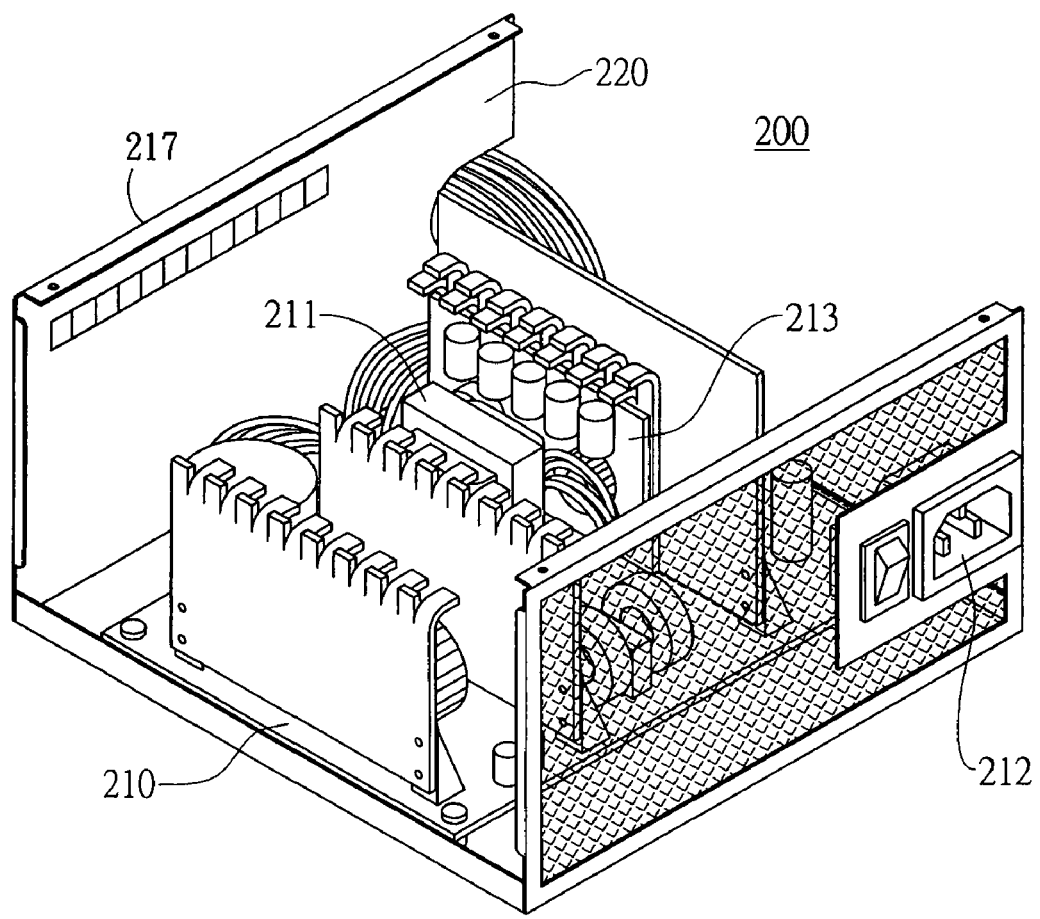
FIG. 2 shows a perspective view of another conventional power supply including a DC-DC converter.
Figure 3:
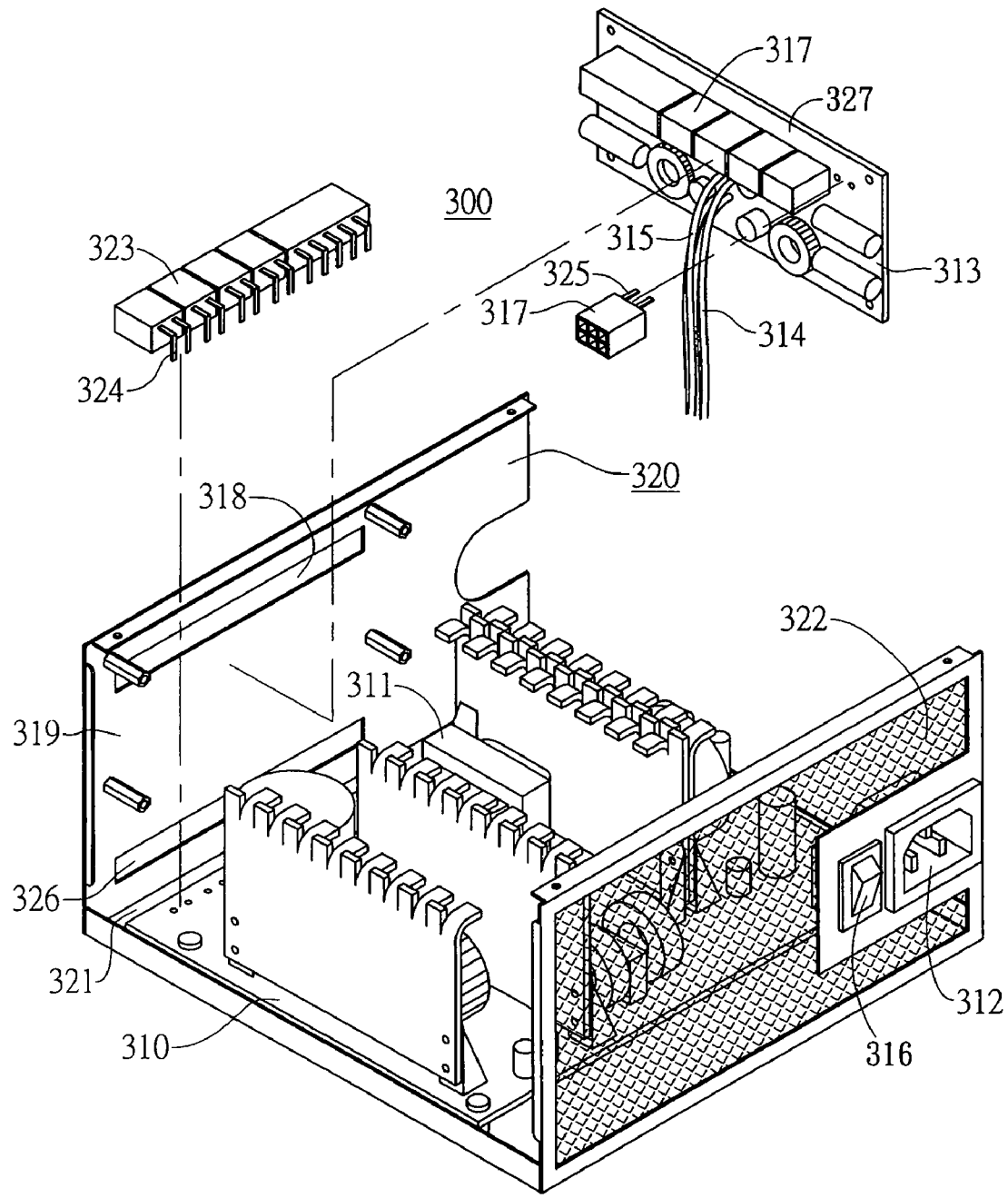
FIGS. 3-5 show perspective views of a power supply having a DC-DC converter module according to a preferred embodiment of the present invention.
Figure 4:
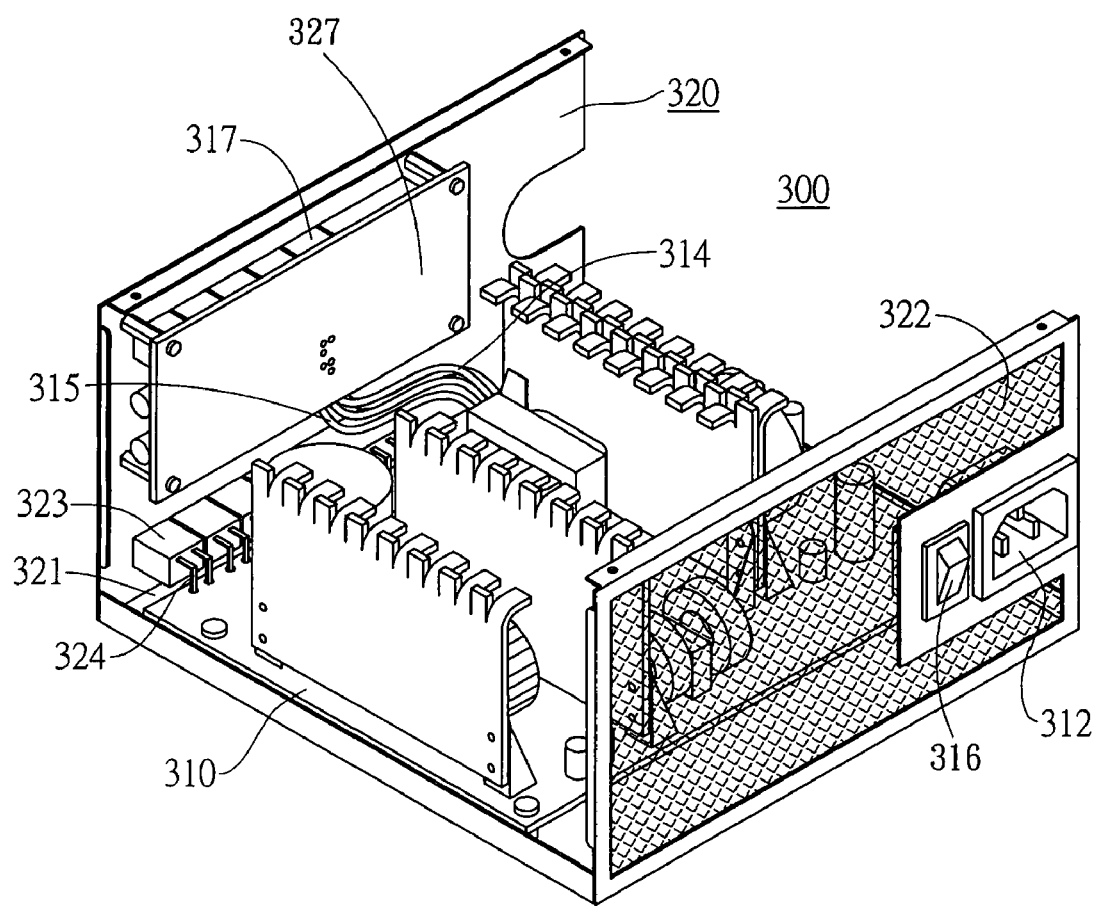
Figure 5:
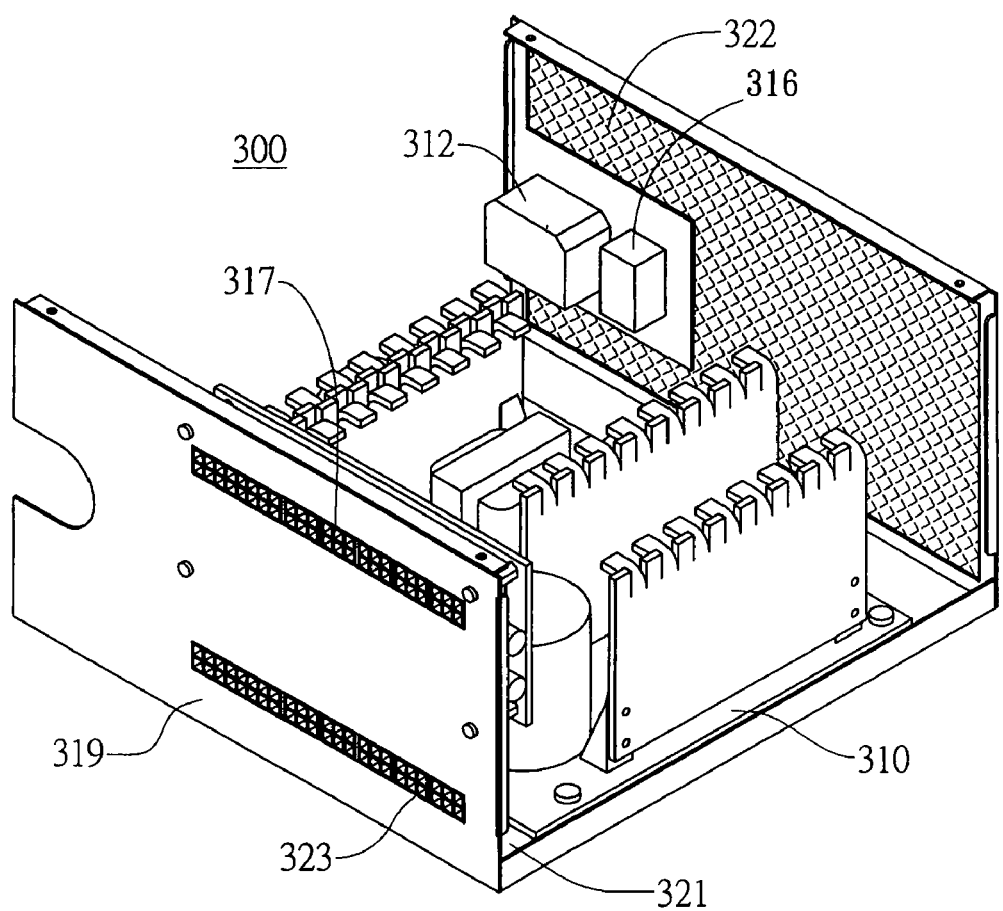

Referring to FIGS. 3-5, perspective views of a power supply having a DC-DC converter module according to a preferred embodiment of the present invention is illustrated. As shown in FIGS. 3-4, the power supply 300 includes a mother board 310, a DC-DC converter module 313, and a housing 320. An example of the housing 320 includes an interior volume defined by a rear panel 319, a bottom panel 321, and a front panel 322. Mounted to the front panel 322 of the power supply 300 includes, but is not limited to, a conventional input socket 312 and a conventional on/off switch 316. The input socket 312 may be, for example, of the conventional type used within the personal computer industry which allows connection of a power cord thereto to supply current from a receptacle or other outlet to the power supply 300. The bottom panel 321 is utilized to affix the mother board 310 thereon. Furthermore, the supply of power may be controlled by the on/off switch 316.

In any case, it is known today that the typical power supply 300 generally comprises some basic components such as transformers 311, capacitors, resistors, filters, etc mounted on the mother board 310. The mother board 310 is electrically connected to an outer power source by means of the input socket 312 for receiving an AC input power from the outer power source and providing a DC output power from the power supply 300 to a component disposed inside of the computer case via a removable cable attached to the power supply 300, wherein the transformer 311 converts the received AC input power into a 12 volt AC power and the 12 volt AC power is filtered by the filter to provide a 12 volt DC power.

The 12 volt DC power is delivered to the DC-DC converter module 313 by means of at least a pair of wires 314 and 315. As shown, the circuitry of the DC-DC converter module 313 includes an individual printed circuit board 327 and is mounted thereon. The DC-DC converter module 313 and the individual printed circuit board 327 are affixed on the rear panel 319 of the housing 320 of the power supply 300.

The design of the DC-DC converter module 313 may be employed to provide the DC output power in different voltages such as 3.3 volt, 5 volt, and/or 12 volt. In other words, the DC-DC converter module 313 includes a DC-DC converter which may be employed to convert the 12 volt DC power into 3.3 volt and/or 5 volt DC power. A socket 317 is electrically coupled to the DC output power in different voltages such as 3.3 volt, 5 volt, and/or 12 volt of the DC-DC converter module 313 by way of an electrically conductive path. As seen in this FIGS. 3-5, the socket 317 mounted to the rear panel 319 of the power supply 300 may be an output socket (e.g. a 3.3 volt, 5 volt, and/or 12 volt output socket).

The DC-DC converter module 313 is affixed on the rear panel 319 of the housing 320 of the power supply 300. The rear panel 319 further includes a hole 318 formed on the rear panel 319 for receiving the socket 317 for supplying 3.3 volt power, 5 volt power, auxiliary power and peripheral power, and/or 12 volt power, respectively. In other words, the socket 317 is mounted through the hole 318 formed on the rear panel 319. The socket 317 utilizes at least one conductor terminal 325 to be inserted almost vertically on the individual printed circuit board of the DC-DC converter module and electrically coupled to the circuitry of the individual printed circuit board.

In addition, the power supply 300 further includes another socket 323 which has at least one conductor terminal 324 including a leg portion extending from a bent portion in a direction almost perpendicular to the major surface of the bent portion of the conductor terminal 324. The leg portion of the conductor terminal 324 is inserted to the mother board 310 and electrically coupled to the circuitry of the mother board 310. The rear panel 319 further includes another hole 326 formed on the rear panel 319 for receiving the socket 323 for supplying 12 volt DC power, auxiliary power, and/or peripheral, respectively.

According to the invention, the DC-DC converter module 313 is separated from the mother board 310 of the power supply 300. In addition, the DC-DC converter module 313 and the socket 317 which utilizes at least one conductor terminal 325 to be inserted almost vertically on the individual printed circuit board of the DC-DC converter module 313 are integrated and configured on the individual printed circuit board. Furthermore, just only a pair of wires 314, 315 are utilized to electrically connect the DC-DC converter module 313 to the mother board 310 in order to reduce the use of the wires and the power lose of the wires.

Consequently, according to the present invention, there are some advantages are described as below:
1. The present invention could keep all the advantages and functionalities of the conventional DC-DC converter.
2. The present invention could reduce the use of the conductive wires in the power supply for supply a 3.3 volt DC power and 5 volt DC power from the mother board to the socket mounted through a hole formed on the rear panel of the power supply by means of a plurality of conductive wires in order to permit the physical and electrical connection of the socket to the mother board.

3. The present invention could further reduce the power consumption and the voltage drop during the power delivery owing to the reduction of the use of the conductive wires in the power supply.
4. The present invention could improve the efficiency of the power supply owing to the reduction of the power consumption.
5. In this present invention, the power specification of the power supply could be easily designed or changed because the mother board and the individual printed circuit board are two separated board in which the DC-DC converter module is mounted on the individual printed circuit board and employed to convert a 12 volt DC power to a 3.3 volt DC power and/or 5 volt DC power by itself such that the circuitries of the mother board and the individual printed circuit board can be designed respectively. Thus, the DC-DC converter module can be designed based on the client's requirements or needs and then be installed into the original power supply to replace the previous DC-DC converter module instead of replacing all the power supply. In other words, the previous DC-DC converter module of the power supply can be replaced individually without replacing all the power supply if the power specification of the power supply would like to be changed.
6. One of the mother board and the DC-DC converter module can be replaced respectively once one of the mother board and the DC-DC converter module is broken because the mother board and the individual printed circuit board are two separated board. Thus, it is very convenient to repair the power supply once one of the mother board and the DC-DC converter module is broken.

To sum up, the present invention could provide a power supply including a DC-DC converter module which is mounted on an individual printed circuit board different from a mother board of the power supply such that the power specification of the power supply could be easily designed or changed and the use of the conductive wires and the power consumption in the power supply could be reduced.

One skilled in the art will understand that the embodiment of the present invention as shown in the drawings and described above is exemplary only and not intended to be limited.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A power supply, comprising:
   a mother board, comprising:
      a transformer operative for transforming an input power into a first AC output power; and
      a filter operative for receiving said first AC output power and filtering said first AC output power into a first DC output power;
   a first socket mounted on said mother board and electrically coupled to a circuitry of said mother board by way of at least one conductor terminal for providing said first DC output power; and
   a DC-DC converter module mounted on a printed circuit board electrically coupled to said mother board, comprising:
      a DC-DC converter operative for receiving said first DC output power and converting said first DC output power into a second DC output power and a third DC output power; and
      a second socket operative for providing said second DC output power and said third DC output power by means of a conductive connection between said printed circuit board and said second socket.

2. The power supply, as recited in claim 1, further comprising a housing which comprises:
   a rear panel comprising a first hole and a second hole operative for receiving said first socket and said second socket; and
   a bottom panel operative for affixing said mother board thereon.

3. The power supply, as recited in claim 1, wherein said mother board and said printed circuit board are two separated and individual boards.

4. The power supply, as recited in claim 2, wherein said mother board and said printed circuit board are two separated and individual boards.

5. The power supply, as recited in claim 1, wherein said first socket has at least one conductor terminal including a leg portion extending from a bent portion in a direction almost perpendicular to the major surface of said bent portion of said conductor terminal and said leg portion of said conductor terminal is inserted to said mother board and electrically coupled to said circuitry of said mother board.

6. The power supply, as recited in claim 4, wherein said first socket has at least one conductor terminal including a leg portion extending from a bent portion in a direction almost perpendicular to the major surface of said bent portion of said conductor terminal and said leg portion of said conductor terminal is inserted to said mother board and electrically coupled to said circuitry of said mother board.

7. The power supply, as recited in claim 1, wherein said second socket comprises at least one conductor terminal to be inserted almost vertically on said printed circuit board of said DC-DC converter module and electrically coupled to said circuitry of said printed circuit board.

8. The power supply, as recited in claim 6, wherein said second socket comprises at least one conductor terminal to be inserted almost vertically on said printed circuit board of said DC-DC converter module and electrically coupled to said circuitry of said printed circuit board.

9. A power supply, comprising:
   a mother board, comprising:
      a transformer operative for transforming an input power into a first AC output power; and a filter operative for receiving said first AC output power and filtering said first AC output power into a first DC output power; and a DC-DC converter module mounted on a printed circuit board electrically coupled to said mother board, comprising:
   a DC-DC converter operative for receiving said first DC output power and converting said first DC output power into a second DC output power and a third DC output power; and
   a socket operative for providing said second DC output power and said third DC output power by means of a conductive connection between said printed circuit board and said socket.

10. The power supply, as recited in claim 9, further comprising a housing which comprises:
   a rear panel comprising a hole operative for receiving said socket; and
   a bottom panel operative for affixing said mother board thereon.

11. The power supply, as recited in claim 9, wherein said mother board and said printed circuit board are two separated and individual boards.

12. The power supply, as recited in claim 10, wherein said mother board and said printed circuit board are two separated and individual boards.

13. The power supply, as recited in claim 9, wherein said socket comprises at least one conductor terminal to be inserted almost vertically on said printed circuit board of said DC-DC converter module and electrically coupled to said circuitry of said printed circuit board.

14. The power supply, as recited in claim 10, wherein said socket comprises at least one conductor terminal to be inserted almost vertically on said printed circuit board of said DC-DC converter module and electrically coupled to said circuitry of said printed circuit board.

15. A DC-DC converter module applied to a power supply which comprises a mother board comprising a transformer operative for transforming an input power into a first AC output power and a filter operative for receiving said first AC output power and filtering said first AC output power into a first DC output power, comprising:
   a DC-DC converter mounted on a printed circuit board electrically coupled to said mother board for receiving said first DC output power and converting said first DC output power into a second DC output power and a third DC output power; and
   a socket mounted on a printed circuit board electrically coupled to said mother board for providing said second DC output power and said third DC output power by means of a conductive connection between said printed circuit board and said socket.

16. The DC-DC converter module, as recited in claim 15, further comprising a housing which comprises:
   a rear panel comprising a hole operative for receiving said socket; and
   a bottom panel operative for affixing said mother board thereon.

17. The DC-DC converter module, as recited in claim 15, wherein said mother board and said printed circuit board are two separated and individual boards.

18. The DC-DC converter module, as recited in claim 16, wherein said mother board and said printed circuit board are two separated and individual boards.

19. The DC-DC converter module, as recited in claim 15, wherein said socket comprises at least one conductor terminal to be inserted almost vertically on said printed circuit board of said DC-DC converter module and electrically coupled to said circuitry of said printed circuit board.

20. The DC-DC converter module, as recited in claim 18, wherein said socket comprises at least one conductor terminal to be inserted almost vertically on said printed circuit board of said DC-DC converter module and electrically coupled to said circuitry of said printed circuit board.

* * * * *